(12) United States Patent
Inoguchi et al.

(10) Patent No.: US 10,586,392 B2
(45) Date of Patent: Mar. 10, 2020

(54) IMAGE DISPLAY APPARATUS USING FOVEATED RENDERING

(71) Applicant: CANON KABUSHIKI KAISHA, Tokyo (JP)

(72) Inventors: Kazutaka Inoguchi, Tokyo (JP); Atsushi Hamaguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/819,665

(22) Filed: Nov. 21, 2017

(65) Prior Publication Data

US 2018/0150999 A1 May 31, 2018

(30) Foreign Application Priority Data

Nov. 28, 2016 (JP) .................... 2016-230567

(51) Int. Cl.
*G06T 19/00* (2011.01)
*G06F 3/01* (2006.01)
*G02B 27/01* (2006.01)
*G06T 7/73* (2017.01)

(52) U.S. Cl.
CPC ........ *G06T 19/006* (2013.01); *G02B 27/0172* (2013.01); *G06F 3/013* (2013.01); *G06T 7/73* (2017.01); *G02B 2027/014* (2013.01); *G02B 2027/0138* (2013.01); *G06T 2207/30204* (2013.01)

(58) Field of Classification Search
None
See application file for complete search history.

(56) References Cited

U.S. PATENT DOCUMENTS

| 9,922,437 | B1* | 3/2018 | Baron ..................... G06T 11/60 |
| 2014/0225887 | A1* | 8/2014 | Aguirre-Valencia ..... G06T 3/40 345/419 |
| 2015/0116315 | A1* | 4/2015 | Takemoto ............... G06T 15/00 345/419 |
| 2016/0041624 | A1* | 2/2016 | Spiessl .................... G06F 3/011 345/8 |
| 2017/0091549 | A1* | 3/2017 | Gustafsson ........ G06K 9/00604 |
| 2017/0372457 | A1* | 12/2017 | Sylvan ................. G02B 27/017 |
| 2018/0059780 | A1* | 3/2018 | Mitchell ................. G06F 3/013 |

FOREIGN PATENT DOCUMENTS

| JP | S53-035313 A | 4/1978 |
| JP | H04-248793 A | 9/1992 |
| JP | 3651590 B2 | 5/2005 |

* cited by examiner

*Primary Examiner* — Xiao M Wu
*Assistant Examiner* — Steven Z Elbinger
(74) *Attorney, Agent, or Firm* — Carter, DeLuca & Farrell LLP

(57) ABSTRACT

Information representing a position and orientation of a captured image or information for deriving the position and orientation is acquired from the captured image as extraction information, and a reduced-information-amount image is generated by reducing an amount of information in the captured image in accordance with a distance from a position that a user is gazing at in the captured image. The reduced-information-amount image and the extraction information are outputted to an external device, and a composite image that has been generated based on the reduced-information-amount image and an image of a virtual space generated by the external device based on the extraction information is received.

11 Claims, 6 Drawing Sheets

IMAGE DISPLAY APPARATUS USING FOVEATED RENDERING

BACKGROUND OF THE INVENTION

Field of the Invention

The present invention relates to a technique of presenting an image of a mixed reality space.

Description of the Related Art

In recent years, mixed reality (MR) techniques in which a presentation is made after blending a physical space and a virtual space without a sense of unnaturalness is being actively researched. In MR techniques, in particular an augmented reality (also referred to as AR) technique for making a presentation after overlapping a virtual space on a physical space has been collecting attention.

AR image presentation is realized by a video see-through method mainly, or by an optical see-through method. In the case of a video see-through method, an image resulting from overlapping an image of a virtual space generated in accordance with a position and orientation of an image capturing apparatus, which is a video camera or the like, on an image of a physical space captured by the image capturing apparatus is presented. The virtual space is specifically configured by, for example, character information or a virtual object rendered in accordance with computer graphics (CG). In the case of an optical see-through method, an image of a virtual space generated in accordance with a position and orientation of an image presentation apparatus is displayed on a transmissive display, and a physical space and the virtual space are composited and recognized on the retina of an observer.

One of the most important problems in an AR technique is how to accurately perform alignment between a physical space and a virtual space in real time, and many efforts have been made thus far. The problem of alignment in AR is the problem of obtaining the position and orientation of an image capturing apparatus in a scene (in other words, a reference coordinate system defined in the scene), when using a video see-through method. In the case of using an optical see-through method, it is the problem of obtaining the position and orientation of an image presentation apparatus in a scene.

As a representative example of a method for realizing alignment in a case of using a video see-through method, there is a method for obtaining the position and orientation of an image capturing apparatus in a reference coordinate system by arranging artificial indices (markers) that have known shape information in a scene, and capturing and recognizing the indices by the image capturing apparatus. The position and orientation of the image capturing apparatus in the reference coordinate system is obtained from a correspondence relation between a three-dimensional position and orientation in the reference coordinate system for an index which is known information, and a projection position of the index in the image that the image capturing apparatus captured.

Meanwhile, research is being actively performed on alignment that uses a feature (to be referred to as a natural feature) originally present in a scene, instead of using an artificial index. For example, patent document 1 (Japanese Patent No. 3651590) discloses an algorithm for directly obtaining a position and orientation of an image capturing apparatus or a three-dimensional structure from points or lines, or from image intensity.

In a method that uses an artificial index and in a method that uses a natural feature, described above, the position and orientation of an image capturing apparatus is obtained based on a two-dimensional position in an image and a three-dimensional position in an environment for a natural feature or an artificial index. For the calculation of the position and orientation, an optimal solution is obtained by equally using all artificial indices or natural features that appear in an image.

Meanwhile, with the purpose of shortening the time required for image rendering, a method (foveated rendering) for rendering only the vicinity of a region that a user gazes at in an image by an original resolution, and rendering other regions by a resolution that is less than the original has been proposed. Foveated rendering is a type of method for optimizing image rendering based on a region that a user gazes at. A method has been disclosed in which an optimization is performed in consideration of both of a computation cost necessary for rendering of an image and image quality experienced by a user, in accordance with a method that renders the image at a high quality for a focal position that the user sees and lowers the quality in rendering as the distance from the focal position increases. Foveated rendering is a method takes advantage of the fact that experienced quality will not be affected even if image quality, for example resolution or the like, is reduced, since the amount of field of view information that a human can recognize decreases as the distance from the focal position increases.

In a video see-through method HMD, to generate an image that overlaps the physical world and a virtual world, it is necessary to send a video image of physical world to an external calculation apparatus that is responsible for rendering. However, there is a problem of transmission load being high in order to send a high-quality physical world image, and so reducing real-image transmission capacity by sending a region that a user does not gaze at at a low resolution, similarly to the foveated rendering described above has been considered. As a technique by which it is possible to reduce transmission capacity at a time of transmission or acquisition of a real image, for example, detecting the viewpoint of a user and having an image capturing apparatus capture a position of interest at a high resolution is disclosed in patent document 3 (Japanese Patent Laid-Open No. H04-248793). In addition, in an image communication method that transmits image information from a transmitter to a receiver and performs an image display, conveying receiver gaze point information to the transmitting side and transmitting only a gaze point portion as high-resolution image information is disclosed in patent document 2 (Japanese Patent Laid-Open No. S53-35313).

However, the idea of performing alignment for overlapping the physical world and a virtual world is not present in the aforementioned patent document. Therefore, when the techniques disclosed in patent documents 2 and 3 are applied to an MR system unchanged, a precision at which a position and orientation of an image capturing apparatus are detected in accordance with a marker or a natural feature in a region that has been subject to a resolution reduction decreases. This results in a lack of stability and a decrease in the precision at which of the physical world and a virtual world are overlapped.

SUMMARY OF THE INVENTION

The present invention was conceived in view of these kinds of problems, and provides a technique for reducing an amount of information transmitted from a head-mounted display to an image processing apparatus, without causing a reduction in a precision at which a captured image and a virtual space image are composited.

According to the first aspect of the present invention, there is provided an image display apparatus, comprising: an acquisition unit configured to acquire, from a captured image, information representing a position and orientation of the captured image or information for deriving the position and orientation, as extraction information; a conversion unit configured to generate a reduced-information-amount image by reducing an amount of information in the captured image in accordance with a distance from a position where a user is gazing at in the captured image; an output unit configured to output the reduced-information-amount image and the extraction information to an external device; and a reception unit configured to receive a composite image generated based on the reduced-information-amount image and an image of a virtual space generated by the external device based on the extraction information.

According to the second aspect of the present invention, there is provided an image display method, comprising: acquiring, from a captured image, information representing a position and orientation of the captured image or information for deriving the position and orientation, as extraction information; generating a reduced-information-amount image by reducing an amount of information in the captured image in accordance with a distance from a position where a user is gazing at in the captured image; outputting the reduced-information-amount image and the extraction information to an external device; and receiving a composite image generated based on the reduced-information-amount image and an image of a virtual space generated by the external device based on the extraction information.

According to the third aspect of the present invention, there is provided a system having an image display apparatus and an external device, wherein the image display apparatus comprises: an acquisition unit configured to acquire, from a captured image, information representing a position and orientation of the captured image or information for deriving the position and orientation, as extraction information; a conversion unit configured to generate a reduced-information-amount image by reducing an amount of information in the captured image in accordance with a distance from a position where a user is gazing at in the captured image; an output unit configured to output the reduced-information-amount image and the extraction information to the external device; and a reception unit configured to receive a composite image generated based on the reduced-information-amount image and an image of a virtual space generated by the external device based on the extraction information, and the external device comprises: a unit configured to generate an image of a virtual space based on the extraction information, generate the composite image based on the generated image of the virtual space and the reduced-information-amount image, and transmit the generated composite image to the image display apparatus.

Further features of the present invention will become apparent from the following description of exemplary embodiments (with reference to the attached drawings).

DESCRIPTION OF THE EMBODIMENTS

Below, explanation will be given for embodiments of the present invention with reference to the accompanying drawing. Note that embodiments described below merely illustrate examples of specifically implementing the present invention, and are only specific embodiments of a configuration defined in the scope of the claims.

First Embodiment

Figure 1:
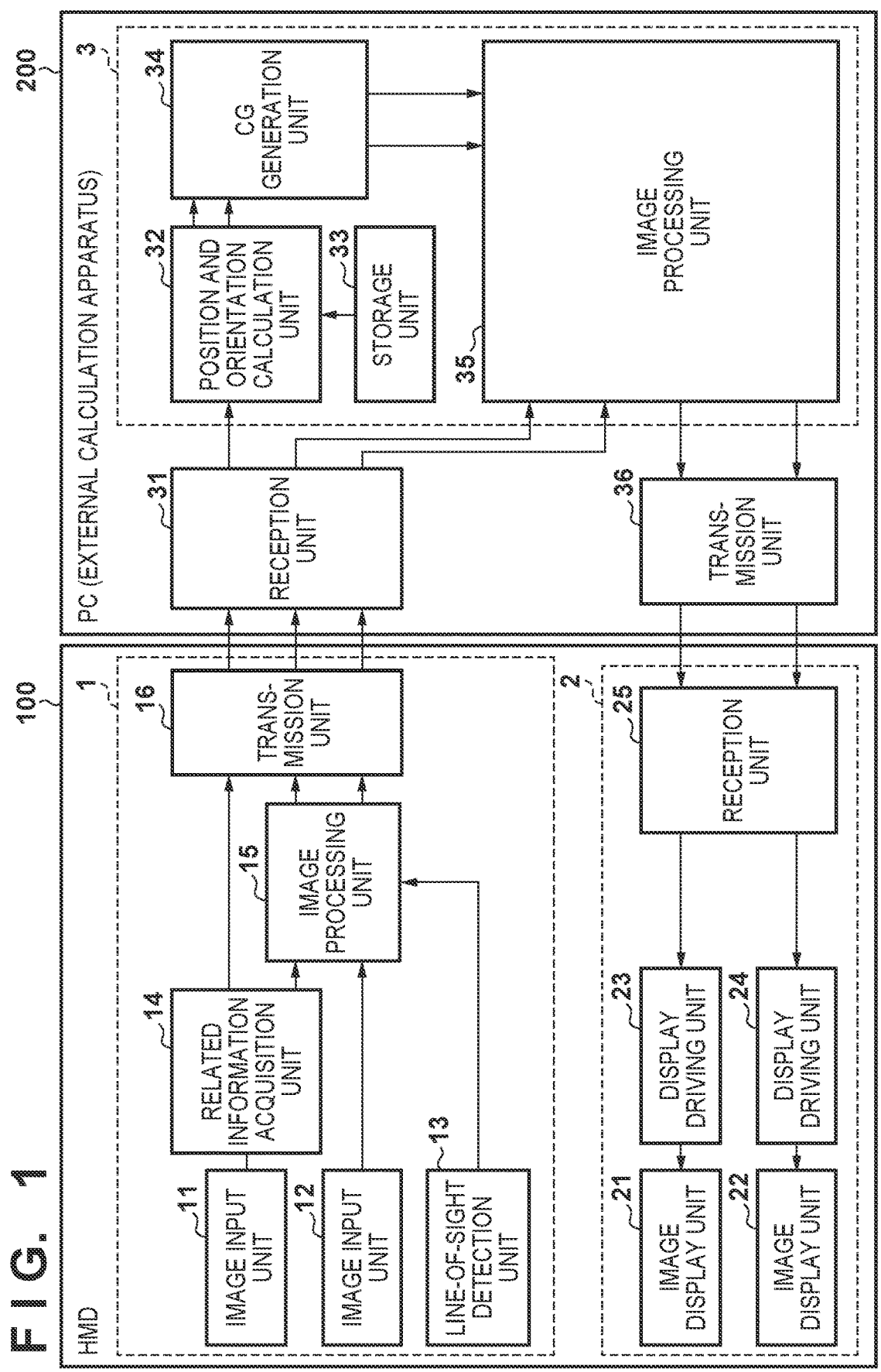
FIG. 1 is a block diagram for illustrating an example of a functional configuration of a system.

Firstly, the block diagram of FIG. 1 is used to give an explanation regarding an example of a functional configuration of a system according to the present embodiment. As illustrated in FIG. 1, the system according to the present embodiment has an HMD 100 as a video see-through type head-mounted display, and a PC (external calculation apparatus) 200 as an image processing apparatus for providing the HMD 100 with an image of a mixed reality space achieved by blending a virtual space and a physical space.

Firstly, explanation is given for the HMD 100. The HMD 100 has an image capturing unit 1 for capturing a physical space that includes an index and transmitting a captured image and information corresponding to the index in the captured image to the PC 200, and a display unit 2 for displaying an image of the mixed reality space transmitted from the PC 200. Firstly, explanation is given for the image capturing unit 1.

An image input unit 11 has a lens and an image sensor, is something for capturing a moving image of a physical space that corresponds to the left eye of a user who wears the HMD 100 on their head, and an image (a captured image) for each captured frame is sequentially outputted to a subsequent stage related information acquisition unit 14.

An image input unit 12 has a lens and an image sensor, is something for capturing a moving image of a physical space that corresponds to the right eye of a user who wears the HMD 100 on their head, and an image (a captured image) for each captured frame is sequentially outputted to a subsequent stage image processing unit 15.

The related information acquisition unit 14 identifies an index from a captured image received from the image input unit 11, and extracts identification information of the index and image coordinates of the index in the captured image as related information from the captured image. For example, in a case of using a plurality of rectangular markers on which two-dimensional barcodes are printed as indices, the related information acquisition unit 14 specifies a region of a marker that appears in a captured image, and acquires identification information or the like for the marker by recognizing the two-dimensional barcode in the region. The related information acquisition unit 14 specifies a centroid position of the specified region as image coordinates of the marker in the captured image. In such a case, identification information of the recognized marker and the image coordinates of the marker in the captured image are included in the related information. In addition, a feature (a natural feature) originally present in the physical space, such as an edge of a desk or a window frame that appears in the captured image may be used as an index.

In any case, to collect related information for obtaining the position and orientation of the image input unit 12 and the image input unit 11, the related information acquisition unit 14 may collect any information as the related information if it is information that can be used for the calculation of the position and orientation of the image input unit 12 and the image input unit 11. Note that the information corresponding to the index that the related information acquisition unit 14 extracts from the captured image may be used for a purpose other than for obtaining the position and orientation of the image input unit 12 and the image input unit 11. The related information acquisition unit 14 may be mounted as a processing circuit, or may be mounted as a computer program that is executed by a processor (not shown) that the HMD 100 has. A line-of-sight detection unit 13 has a lens, an image sensor, and an image processing circuit, and detects a line of sight direction for each of a right eye and a left eye of a user who wears the HMD 100 on their head.

The image processing unit 15 performs resolution conversion processing (such as foveated image processing) so as to, with respect to each of a captured image inputted from the image input unit 11 and a captured image inputted from the image input unit 12, reduce a resolution as a distance from a position (a gaze position) that a user (who is wearing the HMD 100 on their head) is gazing at on the respective captured image increases. The gaze position on the captured image inputted from the image input unit 11 is a position that the left eye of the user is gazing at, and the gaze position on the captured image inputted from the image input unit 12 is the position that the right eye of the user is gazing at. Here, explanation is given for the aforementioned resolution conversion processing with respect to a captured image inputted from the image input unit 11, but similar processing is performed for a captured image inputted from the image input unit 12.

Firstly, the image processing unit 15 specifies a position (a gaze position) on the captured image inputted from the image input unit 11 that the user is gazing at, based on the line of sight direction detected by the line-of-sight detection unit 13. Because a method for obtaining a position (that is, the position on the captured image that a user is gazing at) on a captured image that corresponds to the line of sight direction detected by the line-of-sight detection unit 13 is a well-known technique, detailed explanation thereof is omitted. The image processing unit 15 does not convert the resolution for the inside of a square region R1 for which one side is L1 that is centered on the gaze position in the captured image. In addition, the image processing unit 15 reduces the resolution for a region that is outside of the square region R1 and inside of a square region R2 for which one side is L2 (>L1) that is centered on the gaze position in the captured image to be lower than the resolution in the square region R1. In addition, the image processing unit 15 reduces the resolution for a region outside of the square region R2 to be lower than the resolution of the region inside the square region R2 and outside of the square region R1. In this way, the image processing unit 15 performs, with respect to the captured image, resolution conversion processing so as to reduce the resolution as the distance from the gaze position increases. Note that the resolution conversion processing explained here is an example, and any processing may be used if it is resolution conversion processing that reduces the resolution as the distance from the gaze position increases. By performing such resolution conversion processing it is possible to reduce the amount of information of the captured image. Note that processing for reducing the amount of information of the captured image is not limited to resolution conversion processing. For example, the amount of information of the captured image may be reduced by reducing the number of colors as a distance from a gaze position increases. In other words, processing that reduces the amount of information of a region other than a region that includes a gaze position is sufficient. The image processing unit 15 may be mounted as a processing circuit, or may be mounted as a computer program that is executed by a processor (not shown) that the HMD 100 has.

A transmission unit 16 transmits to the PC 200 captured images for which the amount of information was reduced by the image processing unit 15 (captured images for which resolution conversion processing has been performed on captured images inputted from each of the image input units 11 and 12), and the related information extracted from the captured images by the related information acquisition unit 14. Data communication between the HMD 100 and the PC 200 may be by wired communication, may be by wireless communication, or may be by a combination thereof.

Next, explanation is given for the display unit 2 of the HMD 100. A reception unit 25 receives images (an image for presenting to the right eye of a user, and an image for presenting to the left eye of the user) of the mixed reality space that are transmitted from the PC 200.

A display driving unit 23 is something for performing drive control for a display element or the like such as an LCD or ELD that an image display unit 21 has, and a display driving unit 24 is for performing drive control for a display element or the like such as an LCD or ELD that an image display unit 22 has.

The image display unit 21 is something attached to the HMD 100 so as to be positioned before the left eye of a user who wears the HMD 100 on their head, and has an optical system or the like for presenting a display element and an image displayed on the display element as an enlarged virtual image. Based on the drive control by the display driving unit 23, the image display unit 21 displays an image of the mixed reality space for the left eye which is received by the reception unit 25.

The image display unit 22 is attached to the HMD 100 so as to be positioned before the right eye of a user who wears the HMD 100 on their head, and has an optical system or the like for presenting a display element and an image displayed on the display element as an enlarged virtual image. Based on the drive control by the display driving unit 24, the image display unit 22 displays an image of the mixed reality space for the right eye which is received by the reception unit 25.

Next, explanation is given for the PC 200. The PC 200 has a reception unit 31, a calculation unit 3, and a transmission unit 36. Firstly, explanation is given for the reception unit 31. The reception unit 31 receives information transmitted by the transmission unit 16 of the HMD 100—in other words the captured image that has been subjected to resolution conversion processing and the related information—and transfers the received captured image and related information to the subsequent stage calculation unit 3.

Next, explanation is given for the calculation unit 3. A position and orientation calculation unit 32 uses related information to obtain the position and orientation of the image input unit 11 which captured the captured image from which the related information was extracted. For example, the position and orientation calculation unit 32 uses marker identification information included in related information to acquire an arrangement position for the marker in the physical space which is managed in association with the identification information. The position and orientation calculation unit 32 then calculates the position and orientation of the image input unit 11 based on the acquired arrangement position and the image coordinates of the marker which are included in the related information. Because a technique for calculating the position and orientation of a device that captured a captured image based on an index in the captured image is a well-known technique, detailed explanation thereof is omitted.

Relative position and orientation information indicating a relative position and orientation of the image input unit 12 with respect to the image input unit 11 is registered in a storage unit 33. Here, the position and orientation calculation unit 32 obtains the position and orientation of the image input unit 12 by adding a position and orientation indicated by the relative position and orientation information to the obtained position and orientation of the image input unit 11.

A CG generator 34 generates an image of a virtual space seen from a viewpoint (a left viewpoint) held by the position and orientation of the image input unit 11 as a virtual space image for a left eye, and generates an image of a virtual space seen from a viewpoint (a right viewpoint) held by the position and orientation of the image input unit 12 as a virtual space image for a right eye.

An image processing unit 35 generates a composite image by overlapping the virtual space image for the left eye on the "captured image for which resolution conversion processing was performed with respect to the captured image in accordance with the image input unit 11" received by the reception unit 31 as an image of the mixed reality space for the left eye. The image processing unit 35 further generates a composite image by overlapping the virtual space image for the right eye on the "captured image for which resolution conversion processing was performed with respect to the captured image in accordance with the image input unit 12" received by the reception unit 31 as an image of the mixed reality space for the right eye.

The transmission unit 36 transmits to the HMD 100 the image of the mixed reality space for the left eye and the image of the mixed reality space for the right eye that are generated by the image processing unit 35. The image of the mixed reality space for the left eye is displayed on the image display unit 21, and the image of the mixed reality space for the right eye is displayed on the image display unit 22.

Figure 2:
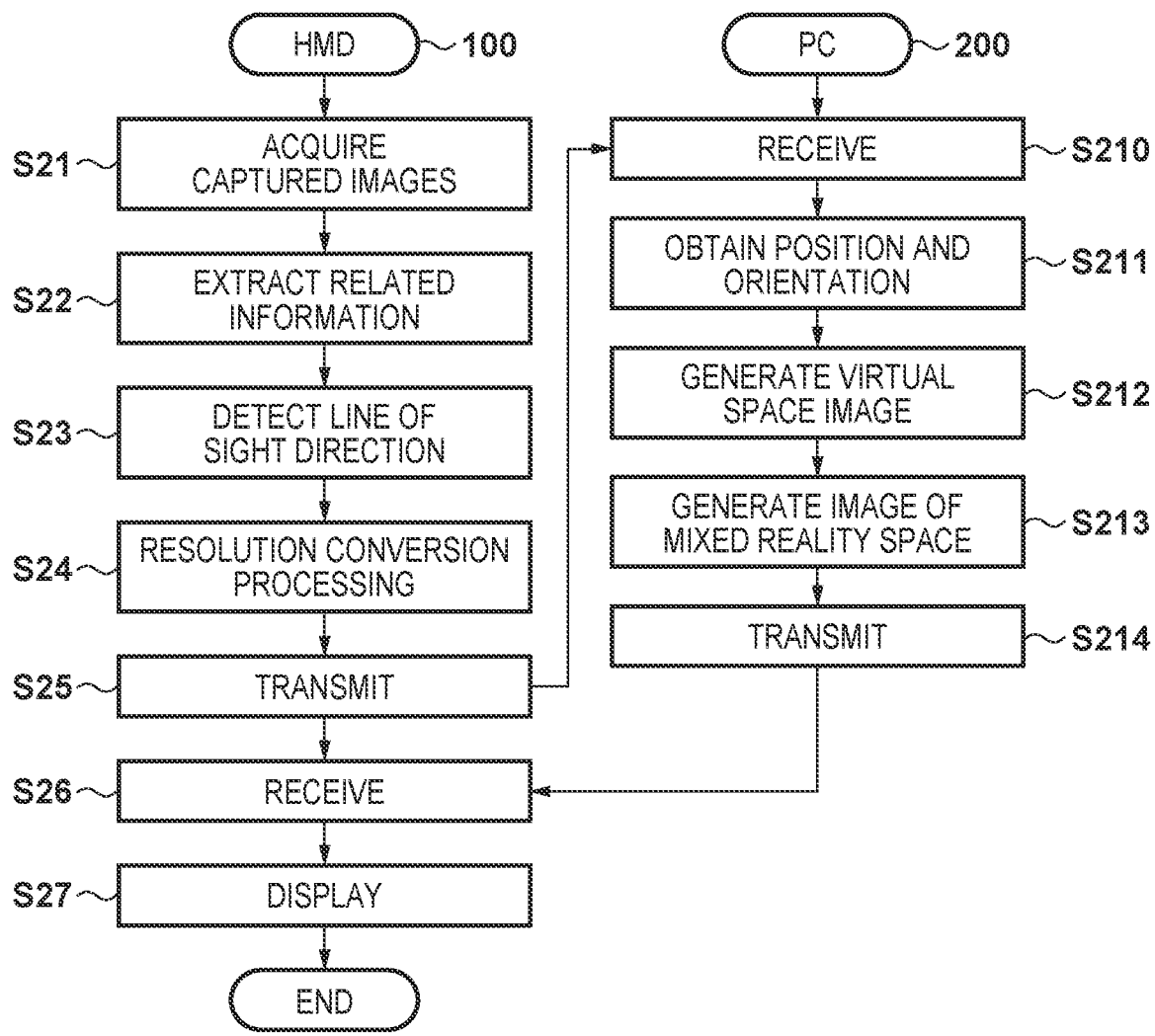
FIG. 2 is a flowchart for processing performed by each of an HMD 100 and a PC 200.

Next, explanation in accordance with the flowchart of FIG. 2 is given for processing performed by each of the HMD 100 and the PC 200 described above. Note that the processing in accordance with the flowchart of FIG. 2 is processing for presenting images of a mixed reality space for one frame to the right eye and the left eye of a user. Here, by repeatedly performing the processing in accordance with the flowchart of FIG. 2 it is possible to present images of a mixed reality space for a plurality of frames to the right eye and the left eye of a user.

In step S21, the image input unit 11 outputs a captured image that captures a physical space to the subsequent stage related information acquisition unit 14, and the image input unit 12 outputs a captured image that captures the physical space to the subsequent stage image processing unit 15.

In step S22, the related information acquisition unit 14 extracts related information from the captured image received from the image input unit 11. In step S23, the line-of-sight detection unit 13 detects line-of-sight directions for each of the right eye and the left eye of a user who is wearing the HMD 100 on their head.

In step S24, the image processing unit 15 performs resolution conversion processing so as to reduce the resolution in a captured image as a distance from a gaze position increases on each of the captured image inputted from the image input unit 11 and the captured image inputted from the image input unit 12.

In step S25, the transmission unit 16 transmits to the PC 200 captured images in which an amount of information has been reduced by the image processing unit 15, and related information extracted from the captured images by the related information acquisition unit 14.

In step S26, the reception unit 25 receives an image of the mixed reality space for a left eye and an image of the mixed reality space for the right eye which were transmitted from the PC 200. In step S27, the image display unit 21 displays the image of the mixed reality space for the left eye that was received by the reception unit 25, and the image display unit 22 displays the image of the mixed reality space for the right eye that was received by the reception unit 25.

In step S210, the reception unit 31 receives related information and captured images that have been subject to the resolution conversion processing and were transmitted by the transmission unit 16 in step S25, and transfers the received captured images and the related information to the subsequent stage calculation unit 3.

In step S211, the position and orientation calculation unit 32 uses related information to obtain the position and orientation of the image input unit 11 (the position and orientation of the left viewpoint) which captured the captured image from which the related information was extracted. The position and orientation calculation unit 32 also obtains the position and orientation of the image input unit 12 (the position and orientation of the right viewpoint) by adding a position and orientation indicated by the relative position and orientation information registered in the storage unit 33 to the obtained position and orientation of the image input unit 11.

In step S212, the CG generator 34 generates an image of the virtual space seen from the left viewpoint as a virtual space image for the left eye, and generates an image of the virtual space seen from the right viewpoint as a virtual space image for the right eye.

In step S213, the image processing unit 35 further generates as an image of the mixed reality space for the left eye by overlapping the virtual space image for the left eye on the "captured image for which resolution conversion processing was performed with respect to the captured image in accordance with the image input unit 11" received by the reception unit 31. The image processing unit 35 further generates an image of the mixed reality space for the right eye by overlapping the virtual space image for the right eye on the "captured image for which resolution conversion processing was performed with respect to the captured image in accordance with the image input unit 12" received by the reception unit 31.

In step S214, the transmission unit 36 transmits to the HMD 100 the image of the mixed reality space for the left eye and the image of the mixed reality space for the right eye that are generated by the image processing unit 35.

By virtue of the system according to the present embodiment described above, the amount of information transmitted from the HMD 100 to the PC 200 is the total amount of information for two captured images and the related information. Here, a difference between the total amount of information for two captured images for which the aforementioned resolution conversion processing has not been performed and the total amount of information for two captured images for which the aforementioned resolution conversion processing has been performed is larger than the amount of information of the related information. In other words, the amount of information transmitted from the HMD 100 to the PC 200 is smaller when transmitting two captured images for which the aforementioned resolution conversion processing has been performed and the related information than when transmitting two captured images for which the aforementioned resolution conversion processing has not been performed. In other words, the system according to the present embodiment has at the least the following two advantages.

(First advantage) . . . Because the related information is extracted from the captured image at the original resolution where the aforementioned resolution conversion processing has not been performed instead of a captured image on which the aforementioned resolution conversion processing has been performed, the precision of detection of an index can be maintained irrespective of the aforementioned resolution conversion processing.

(Second advantage) . . . It is possible to reduce an amount of transmission information more than in a case where captured images for left and right eyes captured by the HMD 100 side are transmitted to the PC 200 unchanged.

Note that, in the present embodiment, although, as illustrated in FIG. 1, configuration was taken such that, after related information is extracted from a captured image inputted from the image input unit 11, the aforementioned resolution conversion processing is performed on the captured image, configurations that can realize the aforementioned first advantage are not limited to the configuration illustrated in FIG. 1. For example, a configuration of the HMD 100 illustrated in FIG. 3 may be employed in place of the configuration of the HMD 100 illustrated in FIG. 1. In the configuration illustrated in FIG. 3, a captured image inputted by the image input unit 11 is inputted to the related information acquisition unit 14 and the image processing unit 15, and processing for extracting the related information by the related information acquisition unit 14 is performed in parallel with the aforementioned resolution conversion processing by the image processing unit 15.

<First Variation>

The HMD 100 may be provided with one image input unit instead of being provided with two: the image input unit 11 and the image input unit 12. In such a case, the HMD 100 has one image display unit instead of two—the image display unit 21 and the image display unit 22 (and has one display driving unit in alignment with this).

In such a case, the related information acquisition unit 14 extracts related information from a captured image in accordance with the one image input unit, and the image processing unit 15 performs the aforementioned resolution conversion processing on the captured image. The transmission unit 16 then transmits to the PC 200 the related information extracted from the captured image by the aforementioned one image input unit, and a captured image that has been subject to resolution conversion processing resulting from the aforementioned resolution conversion processing being performed on the captured image by the aforementioned one image input unit.

The position and orientation calculation unit 32 obtains the position and orientation of the aforementioned one image input unit based on the related information that is received by the reception unit 31, and the CG generator 34 generates an image of a virtual space from a perspective of a viewpoint having the position and orientation obtained by the position and orientation calculation unit 32. The image processing unit 35 generates, as an image of a mixed reality space, a composite image of the captured image which has been subject to the resolution conversion processing and was received by the reception unit 31, and the image of the virtual space generated by the CG generator 34. The transmission unit 36 transmits the image of the mixed reality space generated by the image processing unit 35 to the HMD 100.

The image of the mixed reality space transmitted from the PC 200 is displayed on the aforementioned one image display unit, and the image of the mixed reality space is observed by being shared by the right eye and the left eye of a user.

<Second Variation>

In the first embodiment, related information was extracted from only a captured image for one eye, but related information may be extracted from a captured image for each of the left eye and the right eye. In such a case, the position and orientation calculation unit 32 uses the related information extracted from the captured image for the left eye to calculate the position and orientation of the image input unit 11, and uses the related information extracted from the captured image for the right eye to calculate the position and orientation of the image input unit 12.

Second Embodiment

Figure 4:
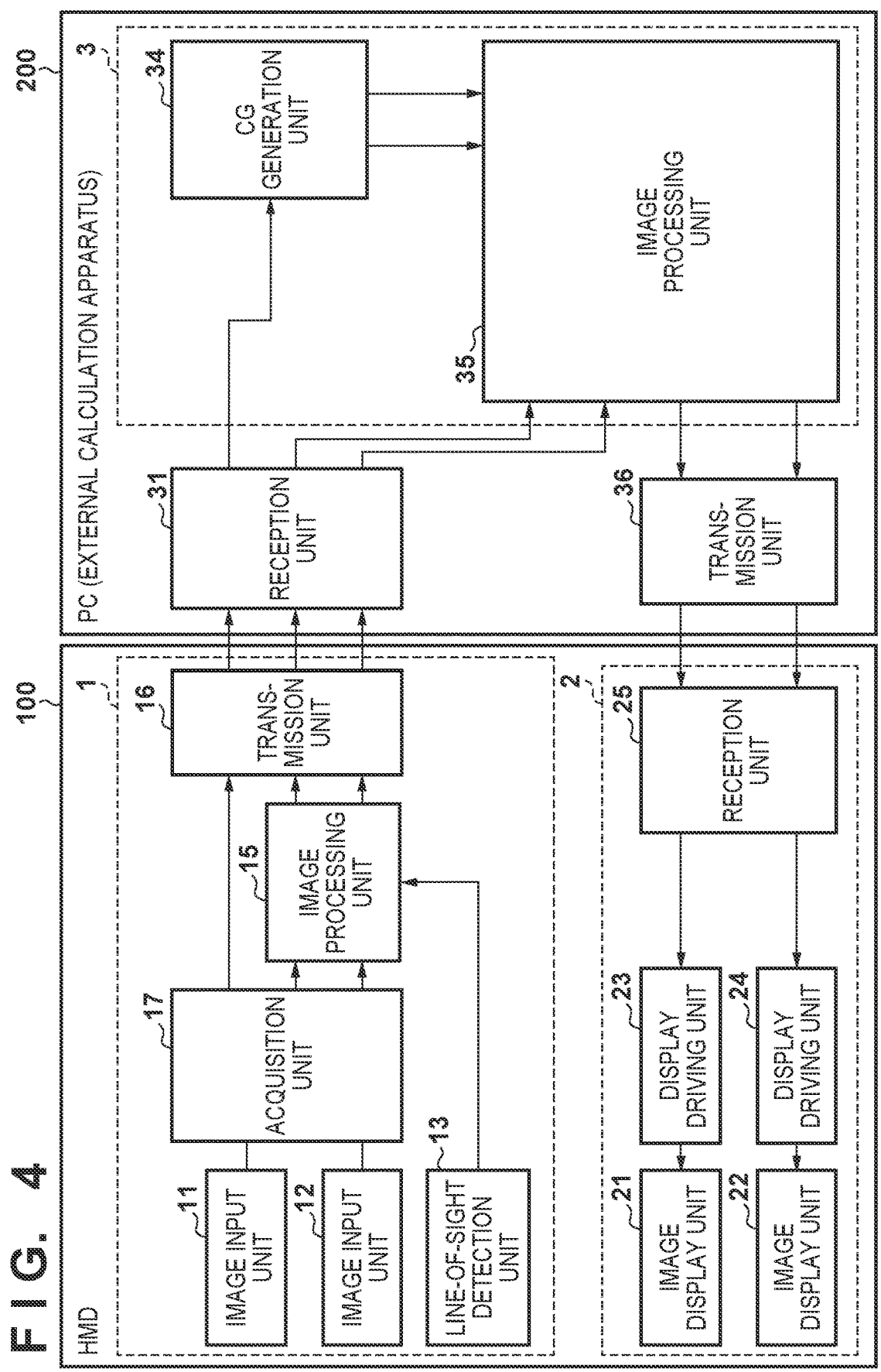
FIG. 4 is a block diagram for illustrating an example of a functional configuration of a system.

In each embodiment or variation below, including the present embodiment, explanation is predominantly given for differences with the first embodiment, and the embodiment or variation is configured to be the same as the first embodiment unless particular mention otherwise is made below. The block diagram of FIG. 4 is used to give an explanation regarding an example of a configuration of a system according to the present embodiment. In FIG. 4, the same reference numerals are added to functional units that are the same as the functional units illustrated in FIG. 1, and explanation for these functional units is omitted. The configuration illustrated in FIG. 4 provides an acquisition unit 17 in place of the related information acquisition unit 14 in the configuration illustrated in FIG. 1, and omits the position and orientation calculation unit 32 and the storage unit 33.

Similarly to the position and orientation calculation unit 32, the acquisition unit 17 obtains the position and orientation of the image input unit 11 based on an index in a captured image that is inputted by the image input unit 11, and also obtains the position and orientation of the image input unit 12 based on an index in a captured image inputted from the image input unit 12.

Furthermore, the acquisition unit 17 uses a correlation between the captured image from the image input unit 11 and the captured image from the image input unit 12 and an amount of parallax between the image input unit 11 and the image input unit 12 to obtain information of a user's hand that appears in the captured images from the image input unit 11 and the image input unit 12. For example, the acquisition unit 17 generates region information for defining a region of a hand in the captured images (the captured images for each of the left eye and the right eye). The region information may be information indicating a region of a pixel group having skin color pixel values in a captured image, or may be information indicating a rectangular region that contains a region of a pixel group having skin color pixel values in a captured image. Furthermore, the acquisition unit 17 obtains a three-dimensional position of a center position (any position on the hand) of the region defined by the region information by using the aforementioned amount of parallax. Because a technique for obtaining region information for defining a hand region in a captured image and a technique for obtaining a three-dimensional position of a captured target object from two different the image capture positions are well-known, detailed explanation for these techniques is omitted. The acquisition unit 17 outputs hand information that includes the generated region information and the obtained three-dimensional position to the transmission unit 16.

The transmission unit 16 transmits to the PC 200 a captured image for which an amount of information has been reduced by the image processing unit 15, the position and orientation of each of the image input unit 11 and the image input unit 12, and the hand information.

Figure 5:
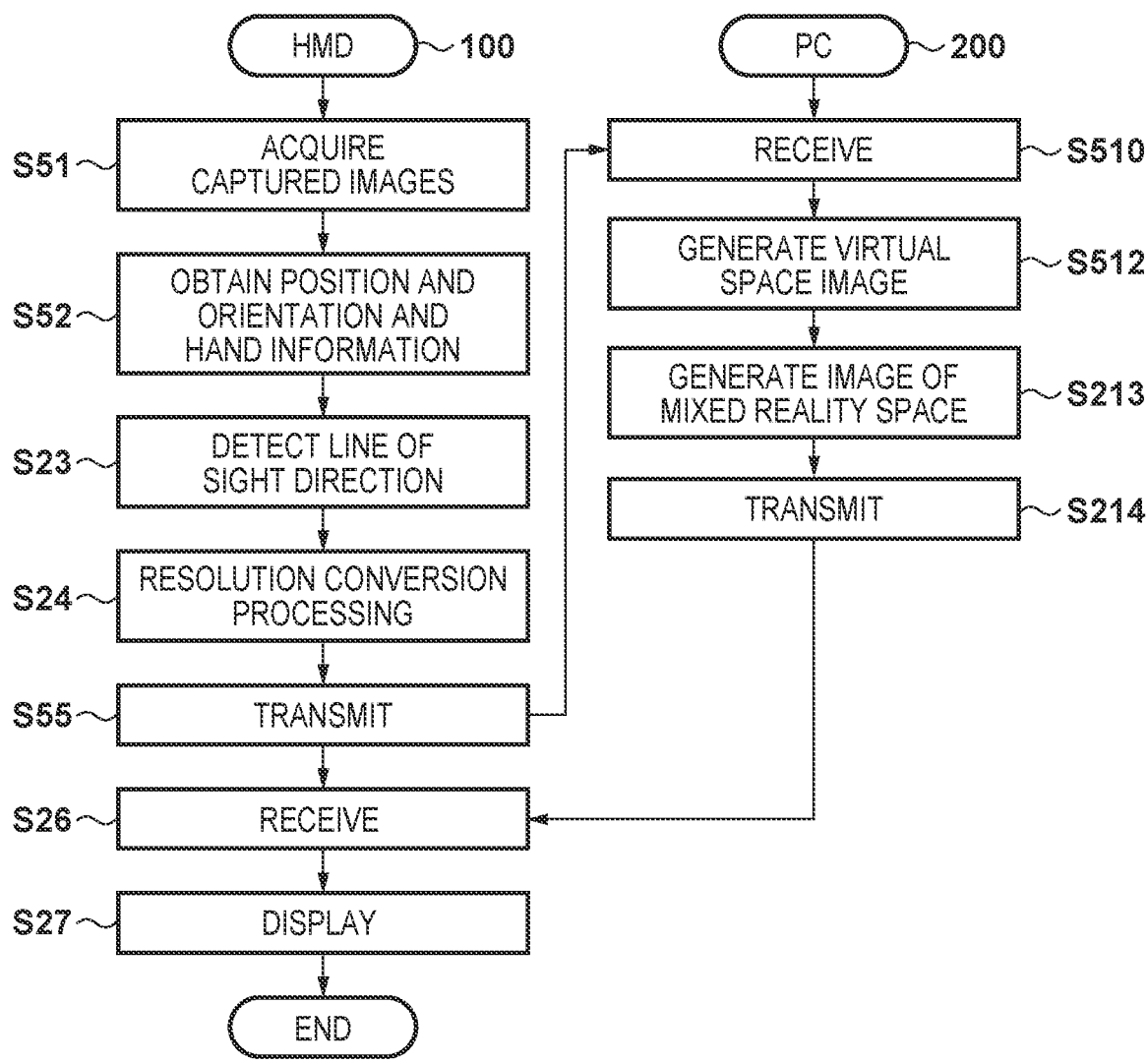
FIG. 5 is a flowchart for processing performed by each of the HMD 100 and the PC 200.

Next, explanation in accordance with the flowchart of FIG. 5 is given for processing performed by each of the HMD 100 and the PC 200 that are included in the system according to the present embodiment. In FIG. 5, the same reference numeral is added to processing steps that are the same as processing steps illustrated in FIG. 2, and explanation for these processing steps is omitted. The processing in accordance with the flowchart of FIG. 5 is processing for presenting images of a mixed reality space for one frame to the right eye and the left eye of a user. Here, by repeatedly performing the processing in accordance with the flowchart of FIG. 5, it is possible to present images of a mixed reality space for a plurality of frames to the right eye and the left eye of a user.

In step S51, the image input unit 11 and the image input unit 12 output a captured image that captures a physical space to the subsequent stage acquisition unit 17. In step S52, the acquisition unit 17 obtains the position and orientation of the image input unit 11 based on an index detected from a captured image inputted from the image input unit 11. The index used here is similar to in the first embodiment, and may be a marker or may be a natural feature. Similarly, the acquisition unit 17 obtains the position and orientation of the image input unit 12 based on an index detected from a captured image inputted from the image input unit 12. Furthermore, in step S52, the acquisition unit 17 uses a correlation between captured images inputted from the image input unit 11 and the image input unit 12 and an amount of parallax between the image input unit 11 and the image input unit 12 to obtain hand information of a hand that appears in the captured images from the image input unit 11 and the image input unit 12.

In step S55, the transmission unit 16 transmits to the PC 200 a captured image for which an amount of information is reduced by the image processing unit 15, the position and orientation of each of the image input unit 12 and the image input unit 11 which are obtained by the acquisition unit 17, and hand information for a hand in the captured images in accordance with the image input unit 11 and the image input unit 12.

In step S510, the reception unit 31 receives the captured image which has been subject to resolution conversion processing, the position and orientation of each of the image input unit 11 and the image input unit 12, and the hand information which are transmitted by the transmission unit 16 in step S55.

In step S512, the CG generator 34 generates an image of a virtual space seen from a viewpoint having the position and orientation of the image input unit 11 received in step S510 as a virtual space image for a left eye. In addition, the CG generator 34 generates an image of a virtual space seen from a viewpoint having the position and orientation of the image input unit 12 received in step S510 as a virtual space image for a right eye.

Note that configuration is such that, whether generating a virtual space image for a left eye or generating a virtual space image for a right eye, rendering is not performed for a virtual object positioned on a far side of a user's hand when compositing on a captured image. For example, configuration is such that, in a case of generating a virtual space image for a left eye, when a surface region defined by the region information included in the hand information is arranged at a three-dimensional position included in the hand information with the surface facing a left viewpoint, no rendering is performed for a partial virtual space occluded by the surface region seen from the left viewpoint. For example, a specific pixel value (0 for example) is allocated to a region that corresponds to this partial virtual space in a virtual space image for the left eye. Similarly, configuration is such that, in a case of generating a virtual space image for a right eye, when a surface region defined by the region information included in the hand information is arranged at a three-dimensional position included in the hand information with the surface facing a right viewpoint, no rendering is performed for a partial virtual space occluded by the surface region seen from the right viewpoint. For example, a specific pixel value (0 for example) is allocated to a region that corresponds to this partial virtual space in a virtual space image for the right eye.

Note that there are various methods for configuring so that rendering is not performed for a virtual object (a virtual space) positioned on a far side of a user's hand when compositing on a captured image, and there is no limitation to the aforementioned method.

In step S213, an image of a mixed reality space is generated by, at pixel positions to which the specific pixel value (0 in the above example) is allocated to in the virtual space image, compositing the pixel value of a corresponding pixel position in the captured image.

By virtue of the system according to the present embodiment described above, the amount of information transmitted from the HMD 100 to the PC 200 is the total amount of information for the hand information and the position and orientation of the image input unit 11 and the image input unit 12, and two captured images. Here, there are cases in which the total amount of information of the hand information and position and orientation of each of the image input unit 11 and the image input unit 12 can be smaller than the amount of information of the related information described above. In such a case, in the present embodiment, it is possible to reduce the amount of information transmitted from the HMD 100 to the PC 200 more than in the first embodiment. Note that, when a three-dimensional position and region information is obtained for all physical objects in a captured image and transmitted to the PC 200, the amount of information transmitted from the HMD 100 to the PC 200 becomes large. However, in the present embodiment, configuration is such that transmission is made to the PC 200 of a three-dimensional position and region information obtained only for a hand for which an in front/behind relationship with respect to a virtual object is important, and an amount of information transmitted to the PC 200 is reduced as much as possible.

Note that, in the present embodiment, processing by the image processing unit 15 is performed after processing by the acquisition unit 17, as illustrated in FIG. 4. However, configuration may be taken such that captured images inputted by the image input unit 11 and the image input unit 12 are inputted to the acquisition unit 17 and the image processing unit 15, and processing by the acquisition unit 17 is performed in parallel with processing by the image processing unit 15.

Third Embodiment

In the first and second embodiments, a gaze position on a captured image was based on a user's line of sight direction that is detected by the line-of-sight detection unit 13. However, determination of a gaze position is not limited to being based on a detection result by the line-of-sight detection unit 13. For example, a defined position on a captured image (for example, a center position of the captured image) may be set in advance as a gaze position. In such a case, the line-of-sight detection unit 13 may be omitted.

Fourth Embodiment

A device such as a smart phone or a tablet terminal device may be used in place of the HMD 100. In addition, a new system may be configured by appropriately combining a part or all of the embodiments or variations explained above.

In other words, the HMD 100 explained in each embodiment or variation above is an example of an image display apparatus having the following configuration. The image display apparatus acquires from the captured image information representing the position and orientation of the viewpoint of the captured image or information for deriving the position and orientation as the extraction information, and generates a reduced-information-amount image by reducing an amount of information in the captured image in accordance with a distance from the position that a user is gazing at. The image display apparatus outputs the reduced-information-amount image and the extraction information to the external device, and receives a composite image that has been generated based on the reduced-information-amount image and an image of a virtual space generated by the external device based on the extraction information.

Fifth Embodiment

Figure 3:
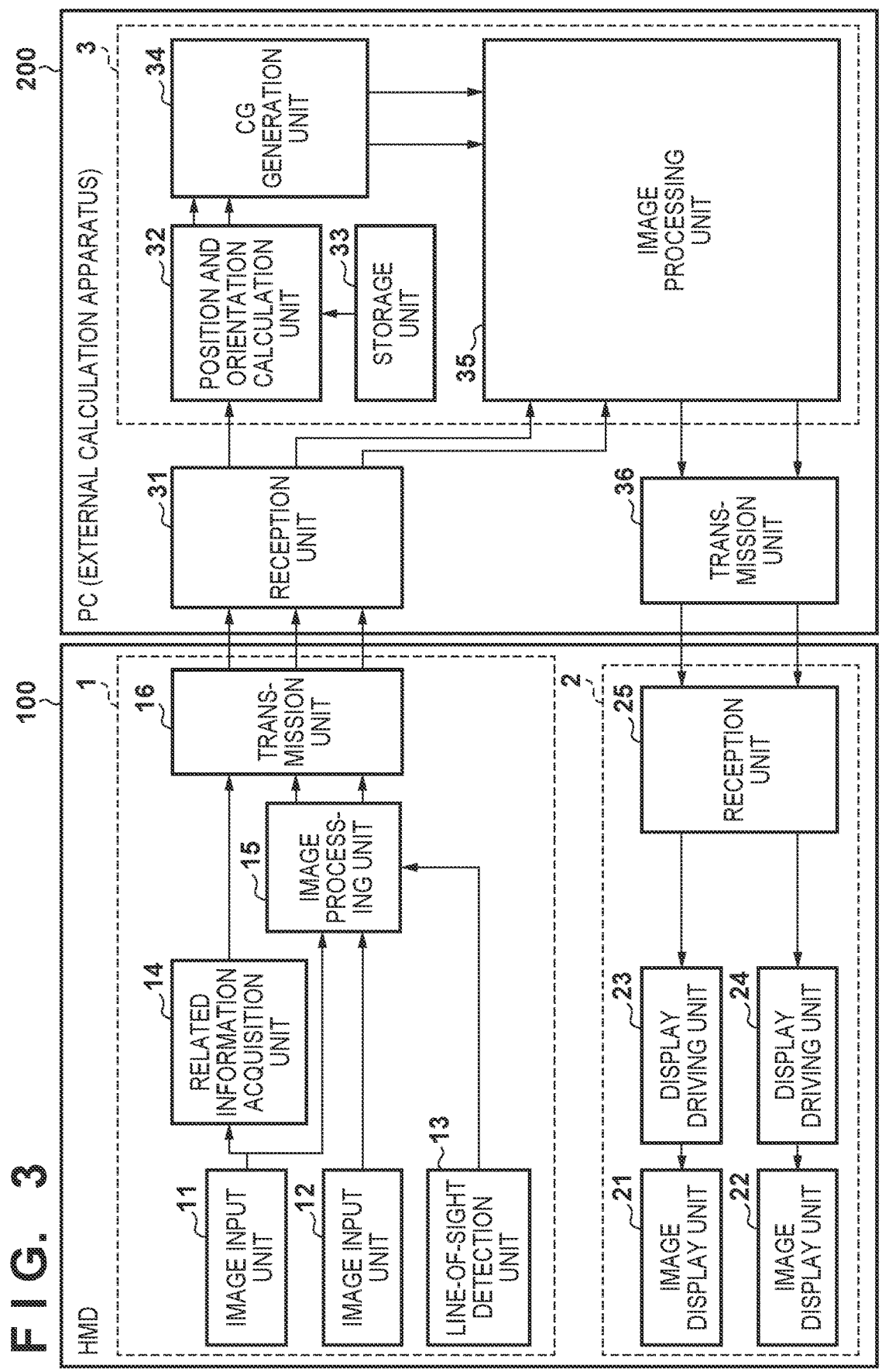
FIG. 3 is a block diagram for illustrating an example of a functional configuration of a system.
Figure 6:
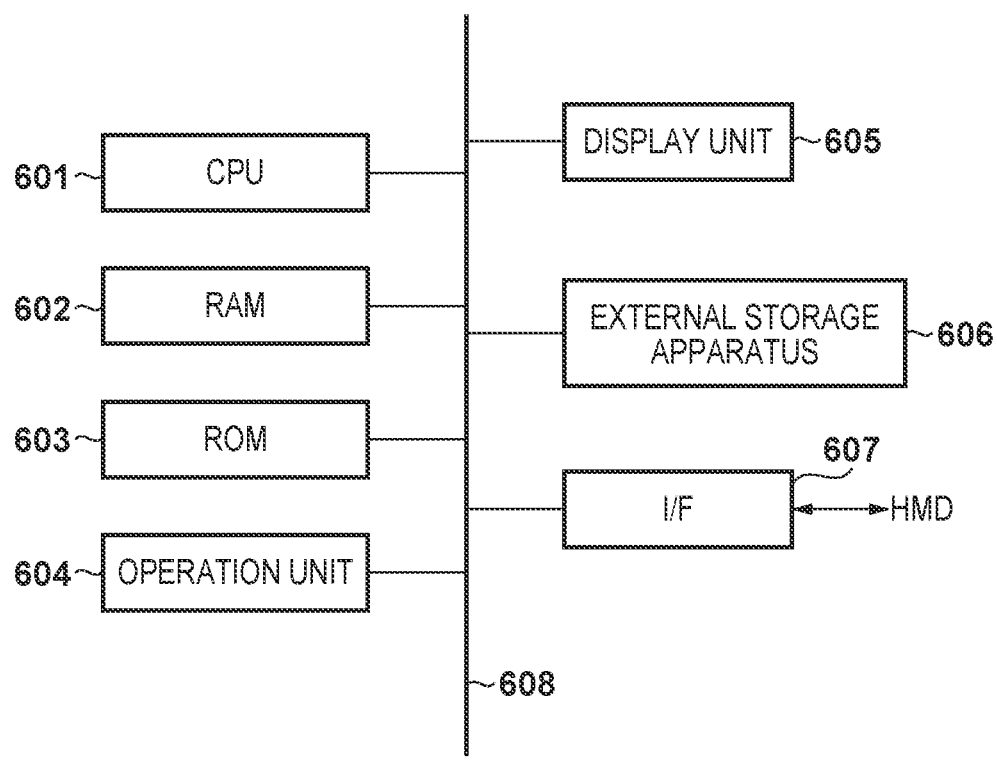
FIG. 6 is a block diagram for illustrating an example of a hardware configuration of a computer apparatus.

Each functional unit of the PC 200 illustrated in FIGS. 1, 3 and 4 may be implemented by hardware. However, the storage unit 33 may be implemented as a memory, the reception unit 31 and the transmission unit 36 may be implemented as interface circuits, and other functional units may be implemented as software (a computer program). In such a case, a computer apparatus that has the storage unit 33 as a memory, the reception unit 31 and the transmission unit 36 as interface circuits, and a processor that can execute the aforementioned computer program can be are applied to the PC 200. The block diagram of FIG. 6 is used to give an explanation regarding an example of a hardware configuration of such a computer apparatus.

A CPU 601 executes various processing by using data and a computer program stored in a RAM 602 or a ROM 603. By this, the CPU 601 performs operation control of the computer apparatus overall, and also executes or controls all processing described above as something that the PC 200 performs.

The RAM 602 has an area for storing computer programs and data loaded from the ROM 603 or an external storage apparatus 606 and data received from the HMD 100 via an I/F (interface) 607. Furthermore, the RAM 602 also has a work area used when the CPU 601 executes various processing. In this way, the RAM 602 can provide various areas as necessary. Also, the aforementioned storage unit 33 may be implemented by the RAM 602. A boot program and setting data the present computer apparatus which do not need to be rewritten are stored in the ROM 603.

An operation unit 604 is configured by a user interface such as a mouse or a keyboard, and a user can input various instructions to the CPU 601 by operating it.

A display unit 605 is configured by a CRT, a liquid crystal screen, projection apparatus, or the like, and can display or project results of processing by the CPU 601 using image, text, or the like. For example, images of the mixed reality space (images of the mixed reality space for the left eye and/or the right eye) explained as something outputted to the HMD 100 may be displayed on the display unit 605. Note that a touch panel screen may be configured to integrate the operation unit 604 and the display unit 605.

The external storage apparatus 606 is a large capacity information storage device as typified by a hard disk drive device. The external storage apparatus 606 stores an OS (operating system), as well as data or a computer program for causing the CPU 601 to execute the processing described above as something that the PC 200 performs. Computer programs stored in the external storage apparatus 606 include the computer program for causing the CPU 601 to realize the functions of each functional unit in FIGS. 1, 3, and 4 except for the reception unit 31, the transmission unit 36, and the storage unit 33. Data stored in the external storage apparatus 606 includes information handled as known information in the above explanation, for example data for rendering a virtual space, and a correspondence relation between identification information for an index and an arrangement position in the physical space of the index. In a case of implementing the storage unit 33 by using the external storage apparatus 606, the external storage apparatus 606 also stores relative position and orientation information indicating a relative position and orientation of the image input unit 12 with respect to the image input unit 11. A computer program or data saved in the external storage apparatus 606 is appropriately loaded to the RAM 602 in accordance with control by the CPU 601, and becomes a target of processing by the CPU 601.

The I/F 607 functions as an interface for connecting the HMD 100 to the present computer apparatus, and functions as the aforementioned transmission unit 36 and reception unit 31.

The CPU 601, the RAM 602, the ROM 603, the operation unit 604, the display unit 605, the external storage apparatus 606, and the I/F 607 are connected to a bus 608. Note that a hardware configuration of a computer apparatus that can be applied to the PC 200 is not limited to the configuration illustrated in FIG. 6.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230567, filed Nov. 28, 2016 which is hereby incorporated by reference herein in its entirety.

What is claimed is:

1. An image display apparatus, comprising:
   one or more processors; and
   a memory coupled to the one or more processors, the memory having stored thereon instructions which, when executed by the one or more processors, cause the image display apparatus to:
   acquire, from a captured image, information representing a position and orientation of the captured image or information for deriving the position and orientation, as extraction information;
   generate, after acquiring the extraction information from the captured image, a reduced-information-amount image by reducing, so that total amount of information for the reduced-information-amount image and the extraction information is smaller than an amount of information in the captured image, the amount of the information in the captured image from which the extraction information was acquired, in accordance with a lateral distance from a position where a user is gazing at in the captured image from which the extraction information was acquired;
   output the reduced-information-amount image and the extraction information to an external device; and
   receive a composite image generated based on the reduced-information-amount image and an image of a virtual space generated by the external device based on the extraction information.

2. The image display apparatus according to claim 1, wherein in acquiring the extraction information, the instructions, when executed by the one or more processors, cause the image display apparatus to acquire image coordinates and identification information of an index included in the captured image as the extraction information.

3. The image display apparatus according to claim 1, wherein in acquiring-the information, which represents the position and orientation of the captured image, the instructions, when executed by the one or more processors, causes the image display apparatus to calculate the information representing the position and orientation of the captured image based on an index included in the captured image, as the extraction information.

4. The image display apparatus according to claim 1, further comprising an image capturing device configured to capture an image of a physical space that includes an index.

5. The image display apparatus according to claim 1, further comprising:
   detector configured to detect a line of sight direction of the user,
   wherein the instructions, when executed by the one or more processors, further cause the image display apparatus to:
   specify the position that the user is gazing at in the captured image based on the line of sight direction detected by the detector, and
   generate the reduced-information-amount image by reducing the amount of information in accordance with a lateral distance from the specified position increasing.

6. The image display apparatus according to claim 1, wherein the instructions, when executed by the one or more processors, further cause the image display apparatus to:
   generate information corresponding to a hand of the user that is in the captured image, and
   transmit the reduced-information-amount image, the extraction information, and the generated information to the external device,
   wherein the external device generates the composite image by compositing the captured image with a partial region of the image of the virtual space, the partial region being a region other than a region defined by the information corresponding to the hand.

7. The image display apparatus according to claim 1, wherein the image display apparatus is a head-mounted display.

8. The image display apparatus according to claim 1, wherein the image display apparatus is a tablet terminal device.

9. The image display apparatus according to claim 1, further comprising a display device configured to display the received composite image.

10. An image display method, comprising:
    acquiring, from a captured image, information representing a position and orientation of the captured image or information for deriving the position and orientation, as extraction information;
    generating, after acquiring the extraction information from the captured image, a reduced-information-amount image by reducing, so that total amount of information for the reduced-information-amount image and the extraction information is smaller than an amount of information in the captured image, the amount of the information in the captured image from which the extraction information was acquired, in accordance with a lateral distance from a position where a user is gazing at in the captured image from which the extraction information was acquired;
    outputting the reduced-information-amount image and the extraction information to an external device; and
    receiving a composite image generated based on the reduced-information-amount image and an image of a virtual space generated by the external device based on the extraction information.

11. A system comprising an image display apparatus and an external device,
    wherein the image display apparatus comprises:
    one or more first processors; and
    a first memory coupled to the one or more first processors, the first memory having stored thereon instructions which, when executed by the one or more first processors, cause the image display apparatus to:

acquire, from a captured image, information representing a position and orientation of the captured image or information for deriving the position and orientation, as extraction information, generate, after acquiring the extraction information from the captured image, a reduced-information-amount image by reducing, so that total amount of information for the reduced-information-amount image and the extraction information is smaller than an amount of information in the captured image, the amount of the information in the captured image from which the extraction information was acquired, in accordance with a lateral distance from a position where a user is gazing at in the captured image from which the extraction information was acquired, output the reduced-information-amount image and the extraction information to the external device, and receive a composite image generated based on the reduced-information-amount image and an image of a virtual space generated by the external device based on the extraction information; and wherein the external device comprises:

one or more second processors; and a second memory coupled to the one or more second processors, the second memory having stored thereon instructions which, when executed by the one or more second processors, cause the external device to:

generate an image of a virtual space based on the extraction information, generate the composite image based on the generated image of the virtual space and the reduced-information-amount image, and transmit the generated composite image to the image display apparatus.

* * * * *